US012803378B2

(12) United States Patent
Ortuño Rodriguez et al.

(10) Patent No.: US 12,803,378 B2
(45) Date of Patent: Nov. 17, 2026

(54) EXTERNAL ROTOR DRIVE ASSEMBLY

(71) Applicant: MILWAUKEE ELECTRIC TOOL CORPORATION, Brookfield, WI (US)

(72) Inventors: Miguel Ángel Ortuño Rodriguez, Querétaro (MX); Cresc Alan Esquivel Machain, Torreón (MX); Christopher J. Kujawski, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 254 days.

(21) Appl. No.: 18/705,677

(22) PCT Filed: Nov. 8, 2022

(86) PCT No.: PCT/US2022/049183

§ 371 (c)(1),
(2) Date: Apr. 29, 2024

(87) PCT Pub. No.: WO2023/086306

PCT Pub. Date: May 19, 2023

(65) Prior Publication Data

US 2026/0135439 A1 May 14, 2026

Related U.S. Application Data

(60) Provisional application No. 63/317,766, filed on Mar. 8, 2022, provisional application No. 63/278,359, filed on Nov. 11, 2021.

(51) Int. Cl.

*F16H 3/28* (2006.01)
*F16H 1/06* (2006.01)
(Continued)

(52) U.S. Cl.

CPC ............... *H02K 7/116* (2013.01); *F16H 1/06* (2013.01); *F16H 1/28* (2013.01); *F16H 3/64* (2013.01);
(Continued)

(58) Field of Classification Search

CPC .. H02K 7/116; H02K 1/22; F16H 1/06; F16H 1/28; F16H 57/021; F16H 57/0416;
(Continued)

(56) References Cited

U.S. PATENT DOCUMENTS 6,833,644 B1 12/2004 Lee
8,348,798 B2 * 1/2013 Lo .......................... B60K 1/04 475/149
(Continued)

FOREIGN PATENT DOCUMENTS

CN 2305801 Y 1/1999
CN 201146427 Y 11/2008
(Continued)

OTHER PUBLICATIONS

Machine translation of DE 102019212472 A1 (Year: 2021).*
(Continued)

*Primary Examiner* — Farhana Pervin
(74) *Attorney, Agent, or Firm* — Michael Best & Friedrich LLP

(57) ABSTRACT

The present disclosure is of an external rotor drive assembly that includes an electric motor and a planetary gear assembly. The electric motor includes a stator that defines a motor axis and a rotor that is disposed around the stator and is rotatable about the motor axis relative to the stator. The planetary gear assembly includes a planetary gear stage including a ring gear, a pinion, a plurality of planet gears and a carrier. The ring gear is connected to the rotor for co-rotation with the rotor. The pinion is fixed against rotation
(Continued)

about the motor axis. The planet gears are meshed with the ring gear and the pinion. The carrier rotatably supports the planet gears and has an output portion that is configured to output torque received from the motor.

15 Claims, 7 Drawing Sheets

(51) Int. Cl.

| | |
|---|---|
| ***F16H 1/28*** | (2006.01) |
| ***F16H 3/64*** | (2006.01) |
| ***F16H 57/021*** | (2012.01) |
| ***F16H 57/04*** | (2010.01) |
| ***H02K 1/22*** | (2006.01) |
| ***H02K 7/116*** | (2006.01) |
| *B25F 5/00* | (2006.01) |
| *F16H 57/02* | (2012.01) |

(52) U.S. Cl.
CPC ....... *F16H 57/021* (2013.01); *F16H 57/0416* (2013.01); *F16H 57/0476* (2013.01); *F16H 57/0486* (2013.01); *H02K 1/22* (2013.01); *B25F 5/001* (2013.01); *F16H 2057/02034* (2013.01); *F16H 2057/02073* (2013.01)

(58) Field of Classification Search
CPC ............. F16H 57/0476; F16H 57/0486; F16H 2057/02034; F16H 2057/02073
See application file for complete search history.

(56) References Cited

U.S. PATENT DOCUMENTS

| | | | | |
|---|---|---|---|---|
| 11,165,297 | B2 * | 11/2021 | Valentini | B25F 5/001 |
| 11,515,753 | B2 * | 11/2022 | Klaus | H02K 7/116 |
| 2004/0124736 | A1 | 7/2004 | Gauthier et al. | |
| 2005/0236168 | A1 * | 10/2005 | Lennartz | B25D 16/00 173/109 |
| 2008/0236908 | A1 * | 10/2008 | Cooper | B60K 17/046 180/65.6 |
| 2019/0028003 | A1 * | 1/2019 | Seith | H02K 21/12 |
| 2021/0066999 | A1 | 3/2021 | Taupeau et al. | |
| 2021/0094413 | A1 * | 4/2021 | Kim | B60K 17/046 |
| 2022/0203512 | A1 * | 6/2022 | Kondo | H02K 9/06 |
| 2024/0278634 | A1 * | 8/2024 | Michel | B60K 17/16 |

FOREIGN PATENT DOCUMENTS

| | | | |
|---|---|---|---|
| CN | 206908460 | U | 1/2018 |
| CN | 108400677 | A | 8/2018 |
| CN | 110649731 | A | 1/2020 |
| CN | 112087076 | A | 12/2020 |
| DE | 102019212472 | A1 | 2/2021 |
| KR | 20080067557 | A | 7/2008 |

OTHER PUBLICATIONS

International Search Report and Written Opinion for Application No. PCT/US2022/049183 dated Mar. 16, 2023 (10 pages).
Partial Supplementary European Search Report for Application No. 22893507.8 dated Aug. 13, 2025 (18 pages).
Extended European Search Report for Application No. 22893507.8 dated Dec. 5, 2025 (19 pages).

* cited by examiner

EXTERNAL ROTOR DRIVE ASSEMBLY

CROSS-REFERENCE TO RELATED APPLICATIONS

This application is a national stage filing under 35 U.S.C. § 371 of International Application No. PCT/US2022/049183 filed on Nov. 8, 2022, which claims priority to U.S. Provisional Patent Application No. 63/317,766 filed on Mar. 8, 2022 and U.S. Provisional Patent Application No. 63/278,359 filed on Nov. 11, 2021, the entire contents of each of which are incorporated herein by reference.

FIELD

The present disclosure relates to power tools, light equipment, and outdoor power equipment, and more particularly, those tools and equipment that incorporate a rotational output.

BACKGROUND

The power tool, light equipment, and outdoor power equipment industries often rely on motor assemblies to provide a rotational output, often in conjunction with a gearbox assembly to match a motor assembly output speed and/or torque to a desired tool output speed and/or torque output.

SUMMARY

The present disclosure provides, in one aspect, an external rotor drive assembly including an electric motor and a planetary gear assembly for creating a rotational output. The electric motor includes a stator that defines a motor axis and a rotor disposed around the stator and rotatable about the motor axis relative to the stator. The planetary gear assembly includes a planetary gear stage with a ring gear, a pinion, a plurality of planet gears, and a carrier. The ring gear is connected to the rotor and co-rotates with the rotor. The pinion is fixed against rotation about the motor axis. The planet gears are meshed with the ring gear and pinion. The carrier rotatably supports the planet gears and includes an output portion configured to output torque received by the motor.

The present disclosure provides, in another aspect, an apparatus with a housing and an external rotor drive assembly at least partially positioned within the housing. The external rotor drive assembly includes an electric motor and a planetary gear assembly for creating a rotational output. The electric motor includes a stator that defines a motor axis and a rotor disposed around the stator that is rotatable about the motor axis relative to the stator. The planetary gear assembly includes a planetary gear stage with a ring gear, a pinion, a plurality of planet gears, and a carrier. The ring gear is connected to the rotor for co-rotation about the motor axis. The pinion is fixed against rotation about the motor axis. The planet gears are meshed with the ring gear and pinion. The carrier rotatably supports the planet gears and has an output portion to output torque received from the motor.

The present disclosure provides, in another aspect, an external rotor drive assembly including a stator and a rotor that is rotatable relative to the stator, and a motor output that is operationally coupled to the rotor.

Other aspects of the disclosure will become apparent by consideration of the detailed description and accompanying drawings.

DETAILED DESCRIPTION

Before any embodiments of the present subject matter are explained in detail, it is to be understood that the subject matter is not limited in its application to the details of construction and the arrangement of components set forth in the following description or illustrated in the following drawings. The subject matter is capable of other embodiments and of being practiced or of being carried out in various ways.

Figure 1:
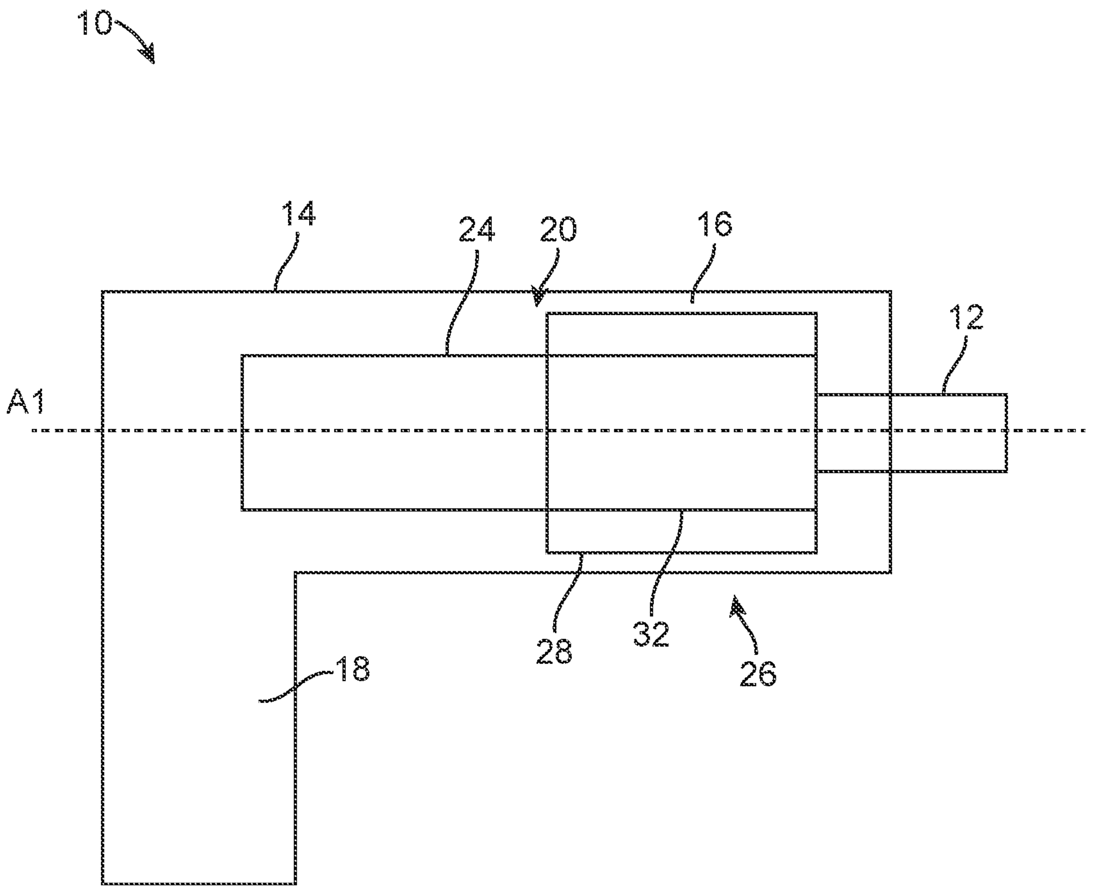
FIG. 1 is a schematic illustrating a power tool including an external rotor drive assembly of the present disclosure.

FIG. 1 illustrates an exemplary tool 10 according to an embodiment of the present disclosure. The illustrated tool 10 is operable to drive an output 12, such as a drill chuck, in a rotational motion. In the illustrated embodiment, the output 12 rotates about a tool axis A1. In other embodiments, the tool 10 may be a hammer drill operable to impart axial movement along the tool axis A1, in addition to rotational movement, to the output 12. Alternatively, the tool 10 may be configured as a piece of construction equipment or outdoor power equipment. As will be discussed in further detail below, the tool 10 includes a particular arrangement of components that provide a higher motor torque output, and consequently a higher tool torque output.

The tool 10 includes a housing 14 that defines a body 16 and a handle 18 extending downward from the body 16. The housing 14 is formed by two clamshell halves. The tool 10 also includes an external rotor drive assembly 20 including an electric motor 24 and a transmission 26 between the electric motor 24 and the output 12. The transmission 26 includes a transmission housing 28 at least partially enclosing a planetary gear assembly 32. The external rotor drive assembly 20 is contained within the housing 14.

Figure 2:
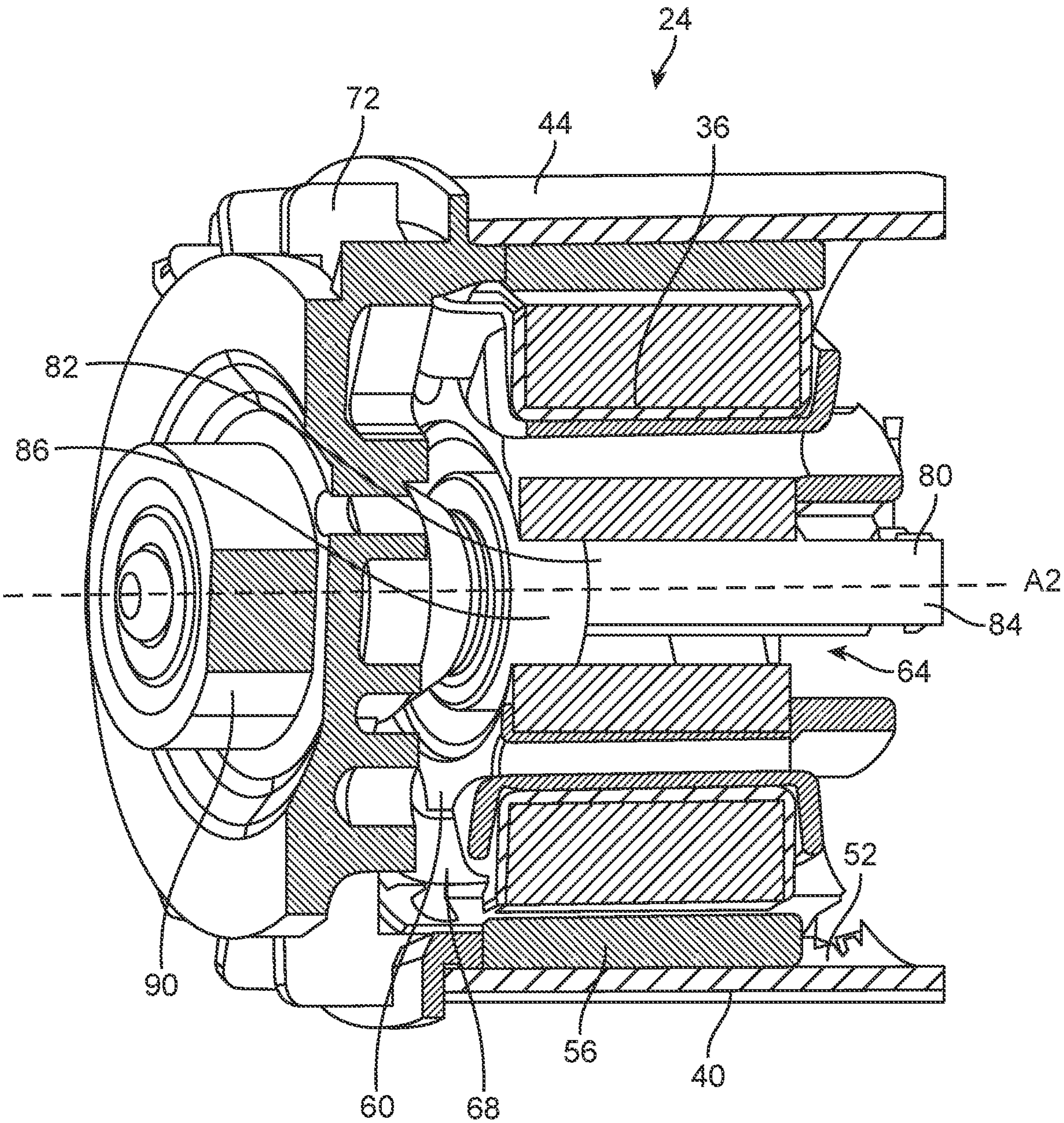
FIG. 2 is a cross-sectional view of an electric motor for use in the external rotor drive assembly of FIG. 1.

With reference to FIG. 2, an exemplary embodiment of the electric motor 24 includes a stator 36 and a rotor 40. The illustrated motor 24 is an external rotor brushless DC (BLDC) electric motor 24. In that regard, the rotor 40 includes a rotor ring 44 defining an inner surface 52. The rotor 40 surrounds the stator 36. Attached to the inner surface 52 are a plurality of magnets 56 that are evenly spaced about a circumference thereof. The stator 36 includes a centrally located stator body 60 with a stator bore 64 defining a motor axis A2 that extends through the stator body 60 and windings 68 supported on corresponding fingers of the stator body 60. The rotor 40 rotates about the motor axis A2 relative to the stator 36.

The electric motor 24 includes a fan 72 connected to the rotor ring 44. In the present embodiment, the fan 72 has an outer diameter that is about the same as the outer diameter of the rotor ring 44. The fan 72 co-rotates with the rotor ring 44 about the motor axis A2. The electric motor 24 also includes a mounting shaft 80 with a first end 82 and a second end 84 and is generally aligned with the motor axis A2. Mounted to the first end 82 of the mounting shaft 80 is a spacer 86 between the stator body 60 and the mounting shaft 80 to maintain the concentric positioning of the mounting shaft 80 in relation to the stator 36. The fan 72 is supported on the rotor ring 44 adjacent the first end 82 of the mounting shaft 80. In other embodiments, the fan 72 may be coupled to the rotor 40 or other component adjacent the second end 84 of the mounting shaft 80 for rotation with the rotor 40 about the motor axis A2. Because the fan 72 is connected to the rotor ring 44, the positions of the fan 72 and rotor ring 44, and thereby the rotor 40, are maintained to concentrically surround the stator 36 by the spacer 86. The rotor 40 may include a mounting bearing 90 on an opposite side of the fan 72 outside the stator bore 64 to at least partially support the electric motor 24 within the housing 14 of the tool 10.

Figure 3:
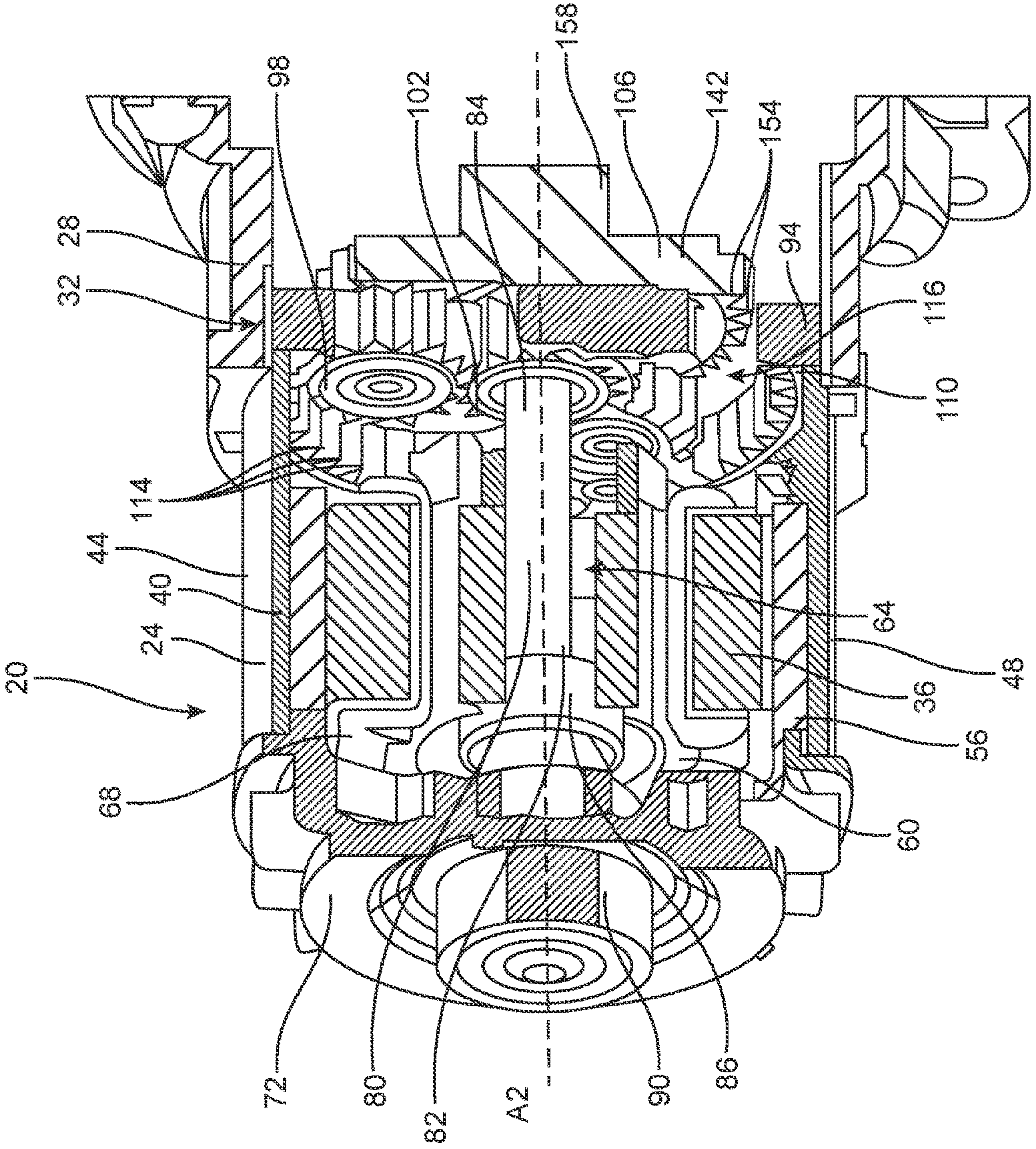
FIG. 3 is a cross-sectional view of an embodiment of the external rotor drive assembly for use in the power tool of FIG. 1.

With reference to FIG. 3, the rotor ring 44 of the rotor 40 is directly connected to the planetary gear assembly 32 and provides a rotational input thereto. As a result of the rotor 40 surrounding the stator 36, the rotational input applied by the rotor ring 44 to the planetary gear assembly 32 is provided at a greater distance from the motor axis A2 than it would be in an internal rotor BLDC in which the rotor is supported within the stator body and the motor output is provided via a shaft coupled to and extending from the rotor body of the internal rotor BLDC. The resulting torque applied to the planetary gear assembly 32 is therefore higher than it would be for an internal rotor BLDC.

The planetary gear assembly 32 includes a ring gear 94, a plurality of planet gears 98, a pinion 102, and a carrier 106 upon which the planet gears 98 are rotatably supported. As previously mentioned, the transmission housing 28 surrounds and at least partially encloses the planetary gear assembly 32.

With continued reference to FIG. 3, the ring gear 94 is concentric with the motor axis A2 and includes radially inwardly extending ring gear teeth 114. In the illustrated embodiment, a rear end of the rotor ring 44 is abutted with and attached to an annular, axially facing surface 110 of the ring gear 94 for co-rotation therewith (e.g., by a welding process, for example). In other embodiments, the ring gear 94 may be disposed within the rotor ring 44 and attached for co-rotation therewith (e.g., by a welding process, an interference fit, etc.).

The plurality of planet gears 98 are disposed in an interior 116 of the ring gear 94. The planet gears 98 are meshed with the ring gear 94. The planetary gear assembly 32 of the present embodiment includes three planet gears 98 but another quantity of planet gears 98 can be used. The pinion 120 is meshed with the plurality of planet gears 98. The pinion 102 is fixedly mounted on the mounting shaft 80 proximate the second end 84 of the mounting shaft 80 such that it does not rotate with the rotor 40 and ring gear 94. The plurality of planet gears 98 are rotatably connected to the carrier 106. As illustrated, the carrier base 142 defines a circular base. The carrier base 142 could define other shapes such as that of an equilateral triangle, with the planet gears 98 disposed at a point of the triangular carrier base 142.

The carrier 106 also includes an output portion 158 extending axially along the motor axis A2 and away from the stator 36. The output portion 158 is connected to an output shaft (not shown), to which the output portion 158 provides rotational motion to the output 12 of the tool 10.

Figure 4:
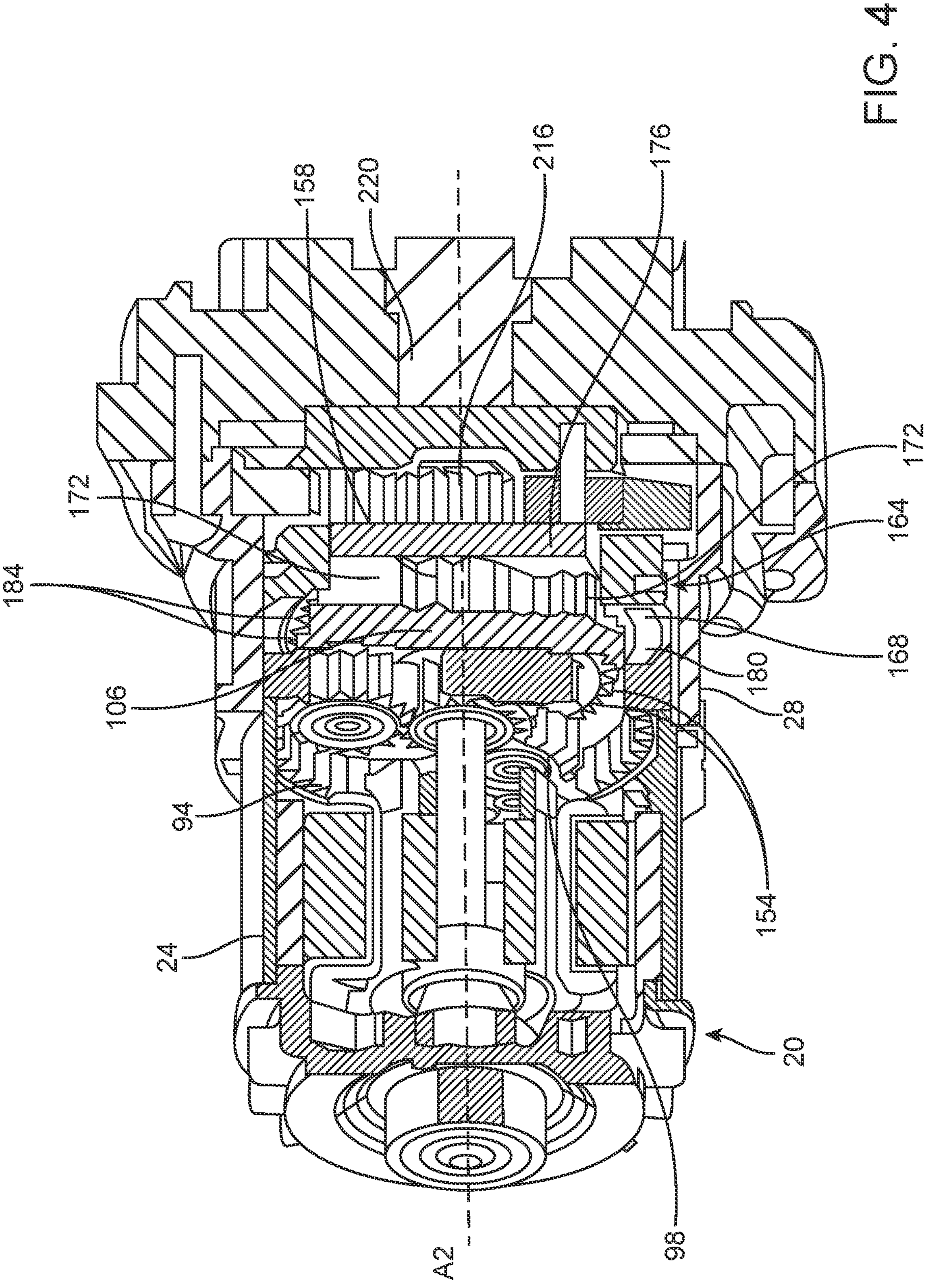
FIG. 4 is a cross-sectional view of another embodiment of an external rotor drive assembly for use in the power tool of FIG. 1.

With reference to FIG. 4, another illustration of an embodiment of the external rotor drive assembly 20 is shown. The planetary gear assembly 32 of the external rotor drive assembly 20 includes a second planetary gear stage 164. The second planetary gear stage 164 includes a second ring gear 168, a second plurality of planet gears 172, and a second carrier 176.

The rotational motion of the carrier 106 in the planetary gear assembly 32 is transferred from the output portion 158 of the carrier 106 to the second planetary gear stage 164.

The second ring gear 168 defines a generally circular ring portion 180 that is concentric with the motor axis A2. A plurality of ring gear teeth 184 extend radially inward from the ring portion 180 toward the motor axis A2. The second ring gear 168 is axially movable along the motor axis A2 between a fixed position (shown) and a free position. The second plurality of planet gears 172 are rotatably mounted to the second carrier 176. The second planetary gear stage 164 of the present embodiment includes three planet gears 172 but another quantity of planet gears 172 can be used. When the second ring gear 168 is in the fixed position, the second plurality of planet gears 172 are meshed with the second ring gear 168. The second carrier 176 includes an output portion 216 extending axially along the motor axis A2 and away from the stator 36. The output portion 216 is connected to an output shaft 220, to which the output portion 216 provides rotational motion to the output 12 of the tool 10.

In the present illustration, the meshed alignment between the various gears causes the transfer of rotational output from the rotor 40 through the planetary gear assembly 32 to the second planetary gear stage 164. The rotational motion of the rotor 40 is transferred through the ring gear 94 to the first plurality of planet gears 98 to the carrier 106 and imparts a rotational motion to the output portion 158 of the carrier 106. The output portion 158, which is in meshed alignment with the second plurality of planet gears 172 imparts a rotational motion to the second plurality of planet gears 172. Depending on whether the second ring gear 168 is in the fixed position or free position, the rotational motion of the output portion 158 can be transferred by various gear paths to the output portion 216 of the planetary gear assembly 32, or in an alternate embodiment, to the output 12.

When the second ring gear 168 is in the fixed position, the second ring gear 168 is meshed with the second plurality of planet gears 172 and is not able to rotate about the motor axis A2. When the output portion 158 of the first carrier 106 rotates about the motor axis A2, the output portion 158 drives the second plurality of planet gears 172 to rotate. The meshed alignment of the second ring gear 168 and the second plurality of planet gears 172 causes the second plurality of planet gears 172 to traverse a circular path about the motor axis A2 thereby causing the second carrier 176 to rotate about the motor axis A2.

When the second ring gear 168 is in the free position, the second ring gear 168 meshes with the carrier gear teeth 154 that extend radially outwardly from the carrier 106. The second ring gear 168 also meshes with the second plurality of planet gears 172. The second ring gear 168 co-rotates about the motor axis A2 with the first carrier 106 at the same speed as the first carrier 106 while maintaining the rotational position of the second plurality of planet gears 172 relative to both the second ring gear 168 and the first carrier 106. The meshed alignment of the carrier 106, second ring gear 168, and second plurality of planet gears 172 causes the second carrier 176, to rotate about the motor axis A2 at the same rotational speed.

In another embodiment (not shown), additional planetary gear stages can be included to further modify the output speed in relation to the output speed provided by the electric motor 24 to the ring gear 94 of the external rotor drive assembly 20.

Figure 5:
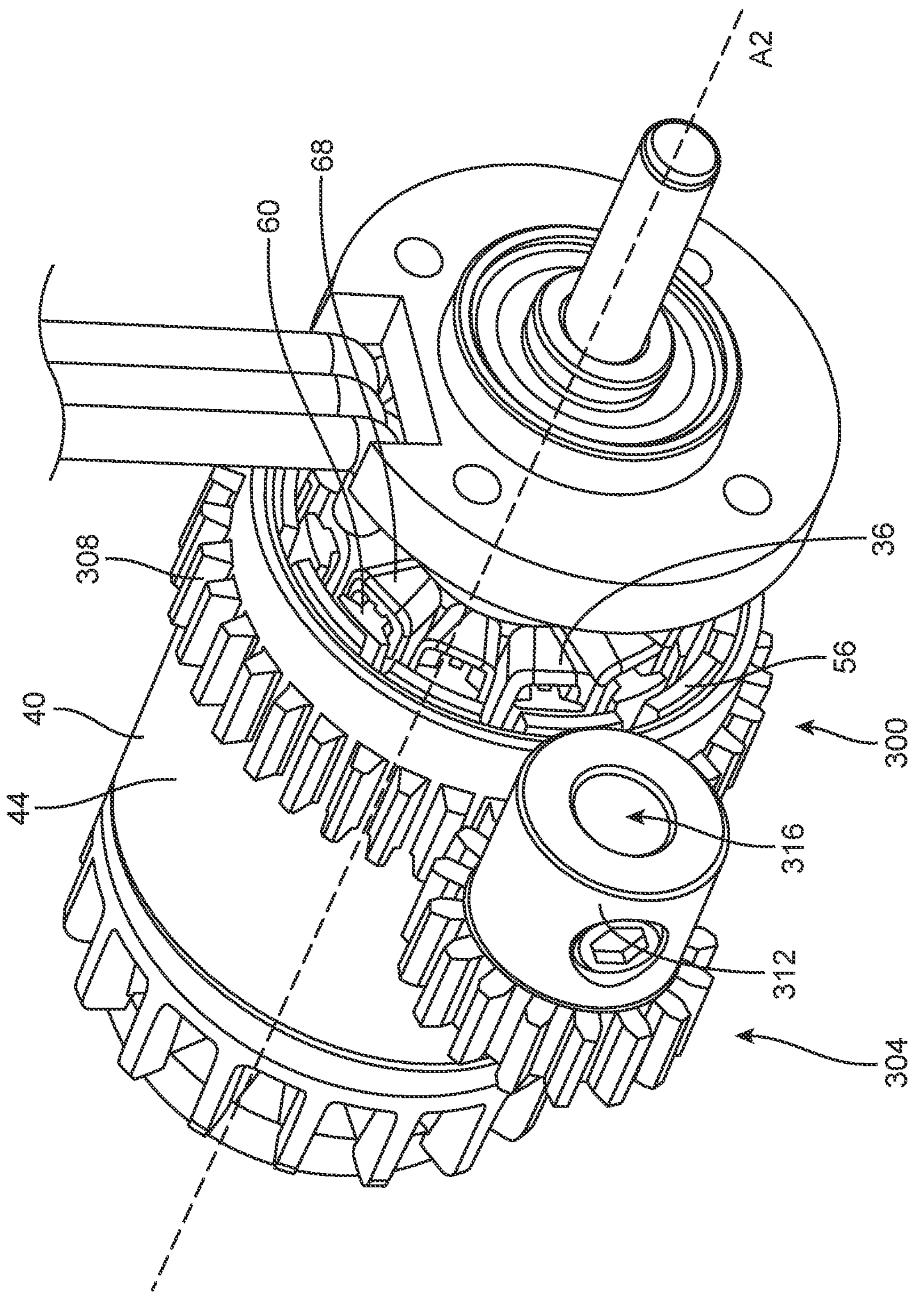
FIG. 5 is a perspective view of another embodiment of the external rotor drive assembly.
Figure 6:
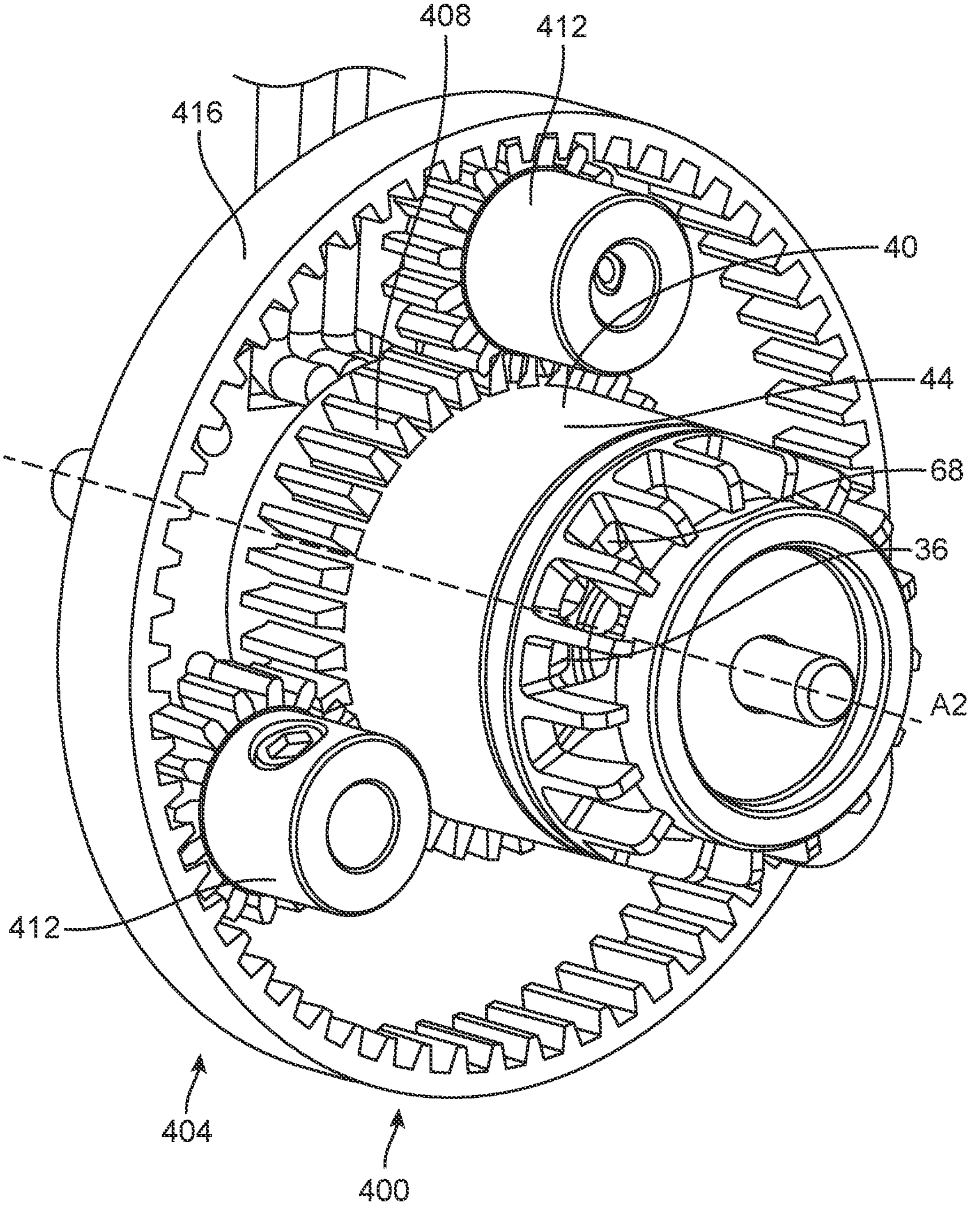
FIG. 6 is a perspective view of another embodiment of the external rotor drive assembly.
Figure 7:
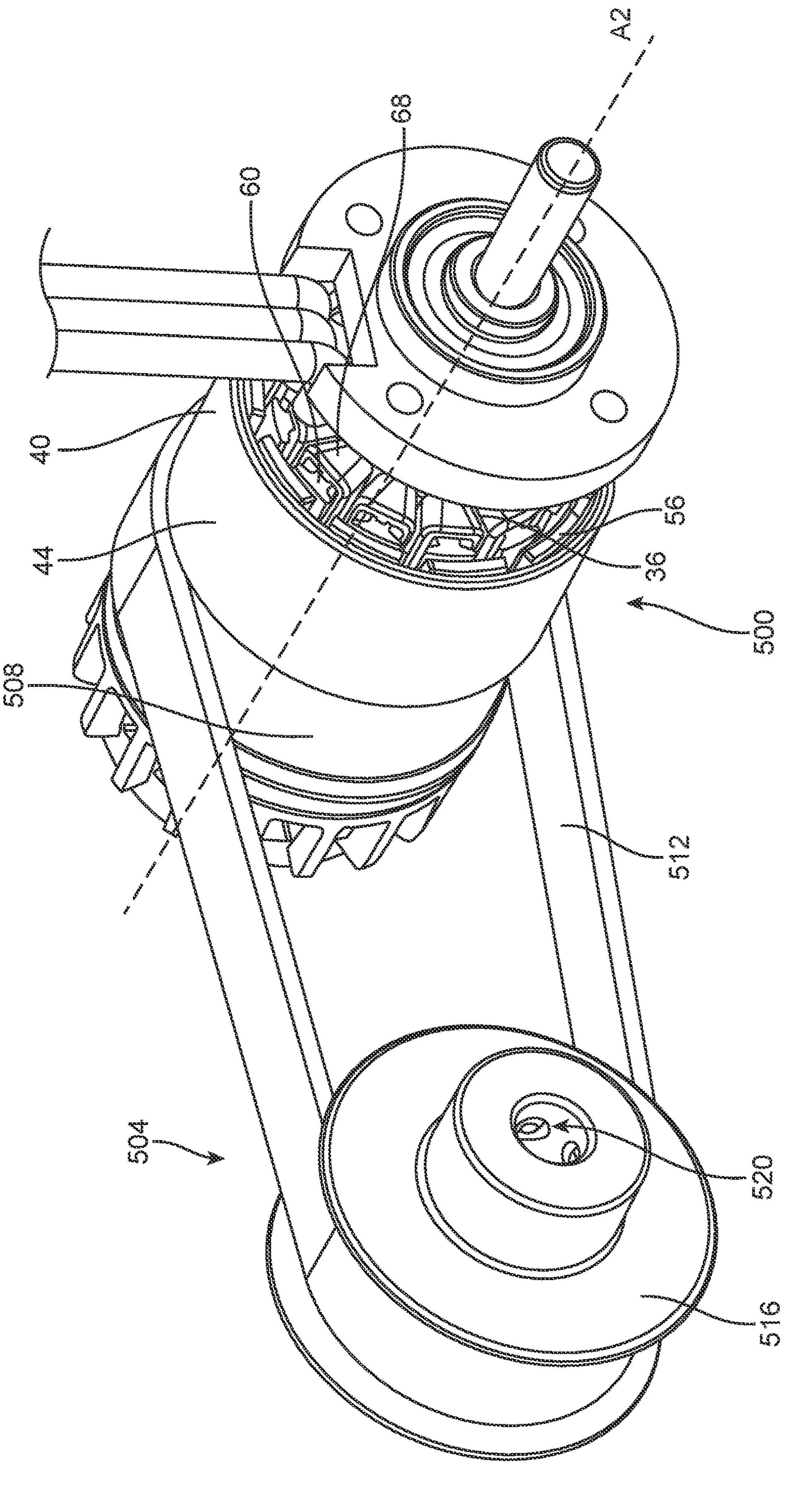
FIG. 7 is a perspective view of another embodiment of the external rotor drive assembly.

FIGS. 5-7 illustrate other embodiments of an external rotor drive assembly 300, 400, 500 having a rotor 40 and a stator 36. In that regard, in each of the embodiments, the stator 36 is surrounded by a rotor 40. The rotor 40 includes a rotor ring 44 defining an inner surface (not shown). Attached to the inner surface are a plurality of magnets 56 that are evenly spaced about a circumference thereof. The stator 36 includes a centrally located stator body 60 with a stator bore (similar to or the same as stator bore 64 of FIG. 2) defining a motor axis A2 that extends through the stator body 60 and windings 68 supported on corresponding fingers of the stator body 60. The rotor 40 rotates about the motor axis A2 relative to the stator 36.

With reference to FIG. 5, an embodiment of an external rotor drive assembly 300 engaging a motor output 304 operationally coupled to the rotor 40 and supported in the housing 14 is shown. The rotor ring 44 includes a rotor gear portion 308 extending radially outward from and circumferentially about the rotor ring 44. The rotor gear portion 308 may be integrally formed with the rotor ring 44 (e.g., integrally cast or otherwise formed with rotor ring 44) or separately formed as a rotor gear ring that is coupled to the rotor ring 44 (e.g., by interference fit, welding, etc.). The motor output 304 includes an output gear 312 meshed with the rotor gear portion 308. The output gear 312 is rotatable in response to rotation of the rotor 40. The motor output 304 may include an output shaft (not shown) coupled to and rotatable with the output gear 312, the output shaft being coupled to the output gear 312 in a bore 316 of the output gear 312. The motor output 304 provides a rotational output for the tool 10 offset from the motor axis A2.

With reference to FIG. 6, another embodiment of the rotor 40 of an external rotor drive assembly 400 operationally coupled to a motor output 404 supported in the housing 14 is illustrated. The rotor ring 44 includes a rotor gear portion 408 extending radially outward from and circumferentially about the rotor ring 44. The rotor gear portion 408 may be integrally formed with the rotor ring 44 or separately formed and coupled to the rotor ring 44.

The motor output 404 includes a plurality of planet gears 412 disposed radially outward of the rotor gear portion 408 and rotatably supported in the housing 14. The planet gears 412 are meshed with the rotor gear portion 408 and rotate in response to rotation of the rotor 40. A ring gear 416 is disposed radially outward of and concentric with the rotor 40. The ring gear 416 is meshed with the planet gears 412. The motor output 404 as presently illustrated includes three planet gears 412, but other quantities of planet gears 412 may be used.

In one embodiment, the planet gears 412 are prevented from orbiting about the stator 36 and the ring gear 416 is rotatable as the motor output 404 in response to rotation of the rotor 40. That is, the planet gears 412 do not translate in a circular path about the motor axis A2 in response to rotation of the rotor 40, but rotate in place, and the ring gear 416 rotates about the motor axis A2 in response to rotation of the rotor 40 and engagement with the planet gears 412. The ring gear 416 may be coupled to and provide rotational output to another gear assembly, such as planetary gear assembly 32 described above.

In another embodiment, the ring gear 416 is fixed, that is, the ring gear 416 does not rotate about the motor axis A2. The planet gears 412 rotate in response to rotation of the rotor 40 and orbit about the motor axis A2 as a result of engagement with the fixed ring gear 416. The planet gears 412 may be rotatably supported by a carrier (not shown) and the meshed engagement of the planet gears 412 with the rotor gear portion 408 and the ring gear 416 create a rotational output of the carrier.

With reference to FIG. 7, another embodiment of an external rotor drive assembly 500 including a rotor 40 operationally coupled to a motor output 504 supported in a housing 14 is illustrated. The rotor ring 44 of the external rotor drive assembly 500 includes a recess 508 extending radially inward about a circumference of the rotor ring 44. The motor output 504 includes a belt 512 and an output pulley 516. The belt 512 is partially disposed in the recess 508 and engaged by the rotor ring 44, for instance, by friction between the belt 512 and the rotor ring 44. The belt 512 engages the output pulley 516, which is spaced apart from the rotor ring 44 and imparts a rotational motion thereto. An output shaft (not pictured) may be coupled to the output pulley 516 in a bore 520 of the output pulley 516. The engagement of the belt 512 with the rotor ring 44 and the output pulley 516 imparts a rotational motion to the output pulley 516 and output shaft.

Although the subject matter has been described in detail with reference to certain preferred embodiments, variations and modifications exist within the scope and spirit of one or more independent aspects of the subject matter as described.

What is claimed is:

1. An external rotor drive assembly comprising:
an electric motor including
a stator defining a motor axis, and
a rotor disposed around the stator, the rotor being rotatable about the motor axis relative to the stator; and
a planetary gear assembly including a planetary gear stage, the planetary gear stage including
a ring gear connected to the rotor for co-rotation therewith about the motor axis,
a pinion fixed against rotation about the motor axis,
a plurality of planet gears meshed with the ring gear and the pinion, and
a carrier rotatably supporting the planet gears and having an output portion configured to output torque received from the motor.

2. The external rotor drive assembly of claim 1, further comprising a mounting shaft upon which the stator is supported, wherein the pinion is coupled to an end of the mounting shaft.

3. The external rotor drive assembly of claim 2, further comprising a spacer coupled between the mounting shaft and the stator at an opposite end of the mounting shaft as the pinion.

4. The external rotor drive assembly of claim 1, wherein the planetary gear stage is a first planetary gear stage, wherein the planetary gear assembly includes a second planetary gear stage comprising:
a second ring gear that is movable between a fixed position and a free position, a second plurality of planet gears meshed with the output portion of the carrier of the first planetary gear stage, and a second carrier rotatably supporting the second plurality of planet gears, wherein, in the fixed position of the second ring gear, the second plurality of planet gears rotate about the motor axis relative to the second ring gear, and wherein, in the free position, the second ring gear is rotationally locked with the second carrier for co-rotation therewith.

5. The external rotor drive assembly of claim 1, further comprising a fan coupled to the rotor for rotation therewith.

6. The external rotor drive assembly of claim 5, wherein the fan is coupled to the rotor at an opposite end of the rotor as the ring gear.

7. An apparatus comprising:

a housing;

an external rotor drive assembly at least partially positioned within the housing, the external rotor drive assembly including an electric motor having a stator defining a motor axis; and a rotor disposed around the stator, the rotor being rotatable about the motor axis relative to the stator; and a planetary gear assembly including a planetary gear stage, the planetary gear stage including a ring gear connected to the rotor for co-rotation therewith about the motor axis;

a pinion fixed against rotation about the motor axis;

a plurality of planet gears meshed with the ring gear and the pinion; and a carrier rotatably supporting the planet gears and having an output portion configured to output torque received from the motor.

8. The apparatus of claim 7, further comprising a mounting shaft upon which the stator is supported, wherein the pinion is coupled to one end of the mounting shaft.

9. The apparatus of claim 7, further comprising a transmission housing at least partially enclosing the planetary gear assembly and fixed in the housing.

10. An external rotor drive assembly comprising:

an electric motor including a stator defining a motor axis, and a rotor including a rotor ring having a rotor gear portion extending radially outward from and circumferentially about the rotor ring, the rotor disposed around the stator, the rotor being rotatable about the motor axis relative to the stator; and a motor output operationally coupled to the rotor, wherein the motor output includes a ring gear and a plurality of planet gears, the ring gear being concentric with the rotor, and wherein the plurality of planet gears engage the rotor gear portion and the ring gear.

11. The external rotor drive assembly of claim 10, wherein the motor output includes an output gear coupled to an output shaft, the output gear engaging the rotor gear portion of the rotor.

12. The external rotor drive assembly of claim 11, wherein the rotor gear portion is integrally formed with the rotor.

13. The external rotor drive assembly of claim 11, wherein a rotor gear ring defining the rotor gear portion is coupled to the rotor.

14. The external rotor drive assembly of claim 10, wherein the ring gear is fixed in a housing, wherein the plurality of planet gears are rotatable about the rotor, and wherein the planet gears provide a rotational output.

15. The external rotor drive assembly of claim 10, wherein the plurality of planet gears are fixed against rotation about the rotor, and wherein the ring gear is rotatable about the rotor and provides a rotational output.

* * * * *